US009862077B2

(12) United States Patent
Slesinski

(10) Patent No.: US 9,862,077 B2
(45) Date of Patent: Jan. 9, 2018

(54) SYSTEM, AN APPARATUS AND A METHOD FOR LASER PROJECTION-ASSISTED FASTENER INSTALLATION

(75) Inventor: Raymond J. Slesinski, Arnold, MO (US)

(73) Assignee: THE BOEING COMPANY, Chicago, IL (US)

( * ) Notice: Subject to any disclaimer, the term of this patent is extended or adjusted under 35 U.S.C. 154(b) by 1160 days.

(21) Appl. No.: 13/459,718

(22) Filed: Apr. 30, 2012

(65) Prior Publication Data

US 2013/0286187 A1 Oct. 31, 2013

(51) Int. Cl.

*H04N 9/47* (2006.01)
*B25B 21/00* (2006.01)
*B25B 23/14* (2006.01)
*B25F 5/02* (2006.01)

(52) U.S. Cl.

CPC .............. *B25B 21/00* (2013.01); *B25B 23/14* (2013.01); *B25F 5/021* (2013.01)

(58) Field of Classification Search

USPC ........................................................... 348/94
See application file for complete search history.

(56) References Cited

U.S. PATENT DOCUMENTS 6,828,525 B1 12/2004 Hayes et al.
7,158,241 B2 1/2007 Slesinski et al.
7,668,616 B2 2/2010 Piasse et al.
7,703,669 B2 4/2010 Amirehteshami et al.
2006/0106483 A1 5/2006 Behan et al.
2009/0037138 A1 2/2009 Behan et al.
2011/0082576 A1 4/2011 Gamboa et al.

(Continued)

FOREIGN PATENT DOCUMENTS

JP 2009-509785 A 3/2009
WO 2007038740 A1 4/2007

(Continued)

OTHER PUBLICATIONS

European Search Report dated Mar. 2, 2016 for Application No. 13160091.8.

(Continued)

*Primary Examiner* — Tracy Y Li
(74) *Attorney, Agent, or Firm* — Womble Bond Dickinson (US) LLP

(57) ABSTRACT

A system is provided that includes a laser projection apparatus and a fastener installation apparatus. The laser projection apparatus is configured to project an identifier of an instruction set including one or more instructions for installing a fastener or fastener collar on a structure, with the laser projection apparatus being configured to project the identifier onto the structure about a location at which the respective fastener or fastener collar is to be installed. The fastener installation apparatus is configured to capture an image of the projected identifier from the structure, determine the identifier from the captured image, and retrieve the instruction set based on the determined identifier. The fastener installation apparatus includes a tool for installing the respective fastener or fastener collar, and the fastener installation apparatus is configured to program the tool according to the retrieved instruction set.

26 Claims, 12 Drawing Sheets

(56) References Cited

U.S. PATENT DOCUMENTS

| | | | | |
|---|---|---|---|---|
| 2011/0113613 | A1 | 5/2011 | Gamboa et al. | |
| 2011/0169924 | A1* | 7/2011 | Haisty et al. | 348/51 |
| 2011/0191058 | A1* | 8/2011 | Nielsen et al. | 702/130 |
| 2011/0239448 | A1* | 10/2011 | Sarh | 29/701 |
| 2011/0262018 | A1* | 10/2011 | Kumar et al. | 382/131 |

FOREIGN PATENT DOCUMENTS

| | | | |
|---|---|---|---|
| WO | 2007038740 | A2 | 4/2007 |
| WO | 2011028362 | A1 | 3/2011 |

OTHER PUBLICATIONS

Chinese Office Action for Application No. 201310154334.X dated Feb. 28, 2017.

Notice of Reasons for Rejection dated Mar. 28, 2017 for Patent Application No. 2013-092037.

* cited by examiner

SYSTEM, AN APPARATUS AND A METHOD FOR LASER PROJECTION-ASSISTED FASTENER INSTALLATION

CROSS-REFERENCE TO RELATED APPLICATION(S)

The present application is related to U.S. patent application Ser. No. 12/575,036, entitled: Method and Apparatus for Establishing a Camera Focal Length for Installing Fasteners, filed on Oct. 7, 2009, U.S. patent application Ser. No. 12/552,895, entitled: Intelligent Fastener System, filed on Sep. 2, 2009, and U.S. Pat. No. 7,703,669, entitled: Intelligent Fastener Installation System, issued on Apr. 27, 2010. The contents of all of the aforementioned are incorporated herein by reference in their entireties.

TECHNOLOGICAL FIELD

The present disclosure relates generally to the installation of fasteners and, in particular, to the installation of fasteners using computer-generated fastener installation instructions based on automated fastener recognition.

BACKGROUND

In manufacturing objects, such as aircraft, a number of components may be secured to one another. For example, skin panels may be attached to frames, spars may be attached to ribs, and other components may be attached to each other to form an aircraft. Fasteners may be used to attach parts to each other. A fastener may be a hardware device that mechanically joins or affixes two or more components together.

Many existing fasteners and/or fastener collars are not marked with any manufacture information such as part number, lot number and/or manufacturer, and are often only marked with a supplier name. A particular type of fastener and/or fastener collar may also have various requirements for installing the fastener such as, for example, a required amount of torque, swage force, preload and/or other parameters. This information may be located only on the package containing the fasteners. When the package is opened, this information may be lost if not entered into a data processing system or paper record system.

Methods exist for ensuring that fasteners are correctly installed. Many of these methods rely on manually checking tables to determine proper installation requirements. Likewise, many existing methods of locating, tracking and/or monitoring fasteners rely on the use of manual tables. Although these methods are adequate, manually entering and checking tables may be time-consuming, unreliable, expensive and/or may experience other types of problems.

Therefore, it would be desirable to have a system, apparatus and method that takes into account at least some of the issues discussed above, as well as possibly other issues.

BRIEF SUMMARY

Example embodiments of the present disclosure are generally directed to a system, apparatus and method for laser projection-assisted fastener installation. According to one aspect of example embodiments, the system includes a laser projection apparatus and fastener installation apparatus that operate on one or more structures (e.g., aircraft parts) in an assembly work space. The laser projection apparatus may be generally configured to project an identifier of an instruction set including one or more instructions for installing a fastener or fastener collar on a structure, with the identifier being projected onto the structure about a location at which the respective fastener or fastener collar is to be installed. In one example, the laser projection apparatus is configured to determine the location on the structure based on a file including information that defines the structure and specifies the location. In one example, the structure includes a hole for receiving the fastener, and the laser projection apparatus is configured to project the identifier about the hole.

The fastener installation apparatus is generally configured to capture an image of the projected identifier from the structure, determine the identifier from the captured image, and retrieve the instruction set based on the determined identifier. The fastener installation apparatus of one example includes a tool for installing the respective fastener or fastener collar. The fastener installation apparatus, then, may be configured to program the tool according to the retrieved instruction set. In one example, one or more instructions of the instruction set include one or more of a torque, swage force or pre-load to be applied to the fastener or fastener collar.

In one example, the laser projection apparatus may be configured to sequentially project the identifier onto the structure about a plurality of locations at which a respective plurality of fasteners or fastener collars are to be installed, with the identifier(s) being of a respective instruction set(s). In this example, for at least two of the plurality of locations, the laser projection apparatus may be configured to sequentially project different identifiers for different instruction sets. Also in this example, for the identifier projected about each location in sequence, the fastener installation apparatus may be configured to capture the image of the projected identifier, determine an identifier of the identifier(s) from the captured image, retrieve the instruction set based on the identifier, and program the tool according to the retrieved instruction set. In one example, for each of at least some of the plurality of locations, the fastener installation apparatus may be configured to transmit (by wire or wirelessly) an indication of installation of a fastener or fastener collar at the respective location, and in response thereto, the laser projection apparatus may be configured to move projection of the identifier about the respective location to projection of the identifier about a next location in sequence.

In other aspects of example embodiments, a laser projection apparatus, fastener installation apparatus and method are provided for laser projection-assisted fastener installation. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

Figure 8:
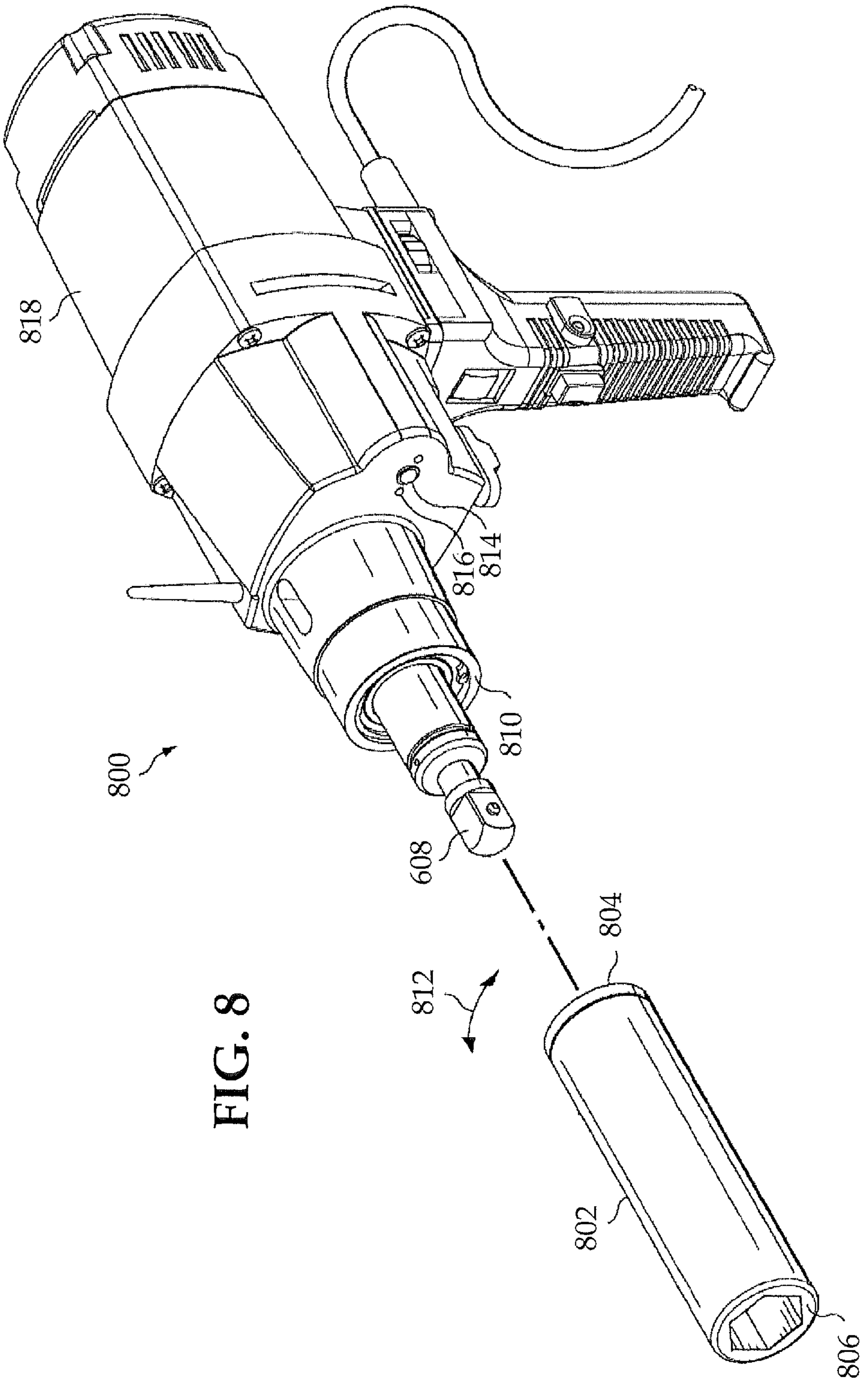
Figure 9:
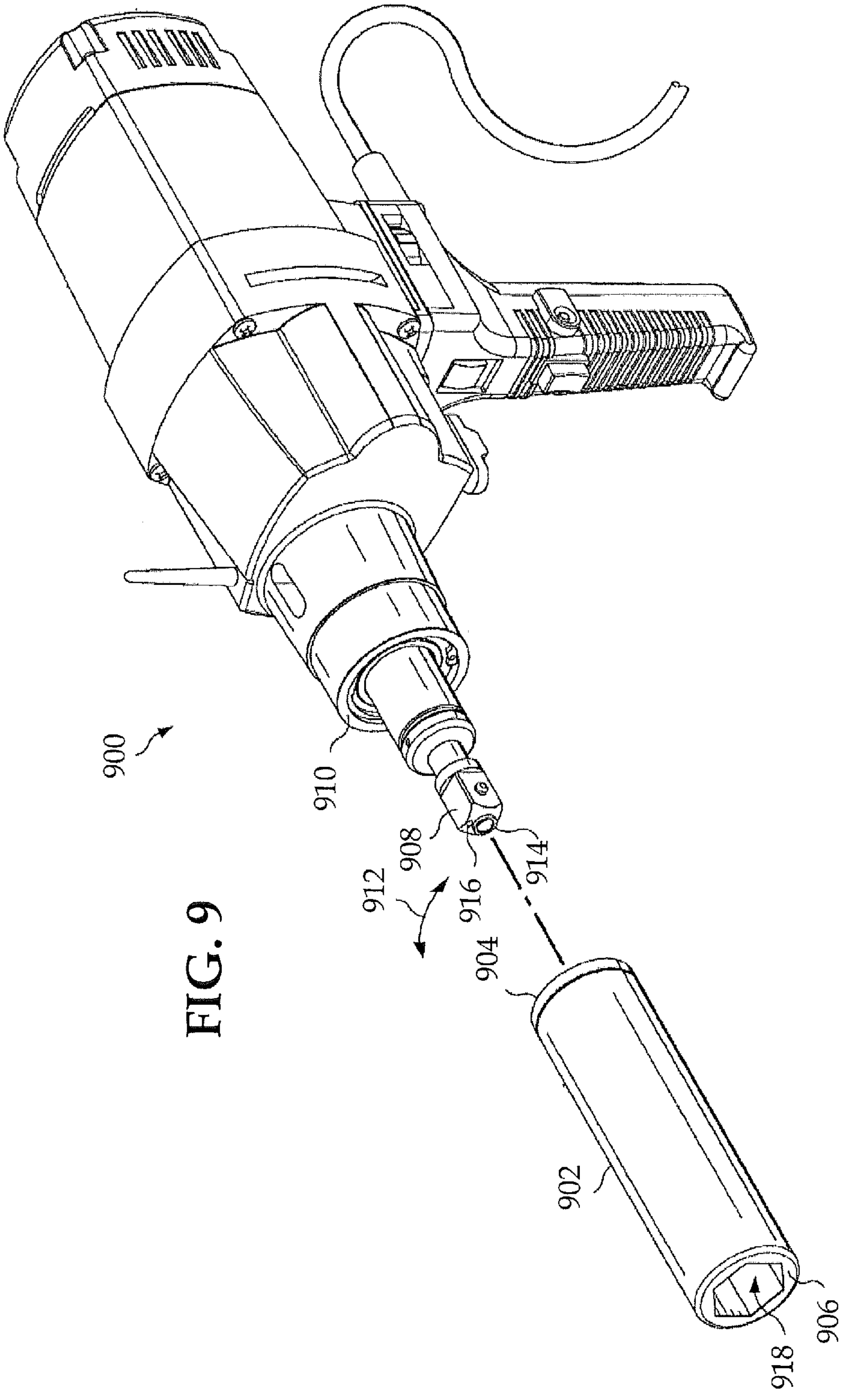
Figure 9A:
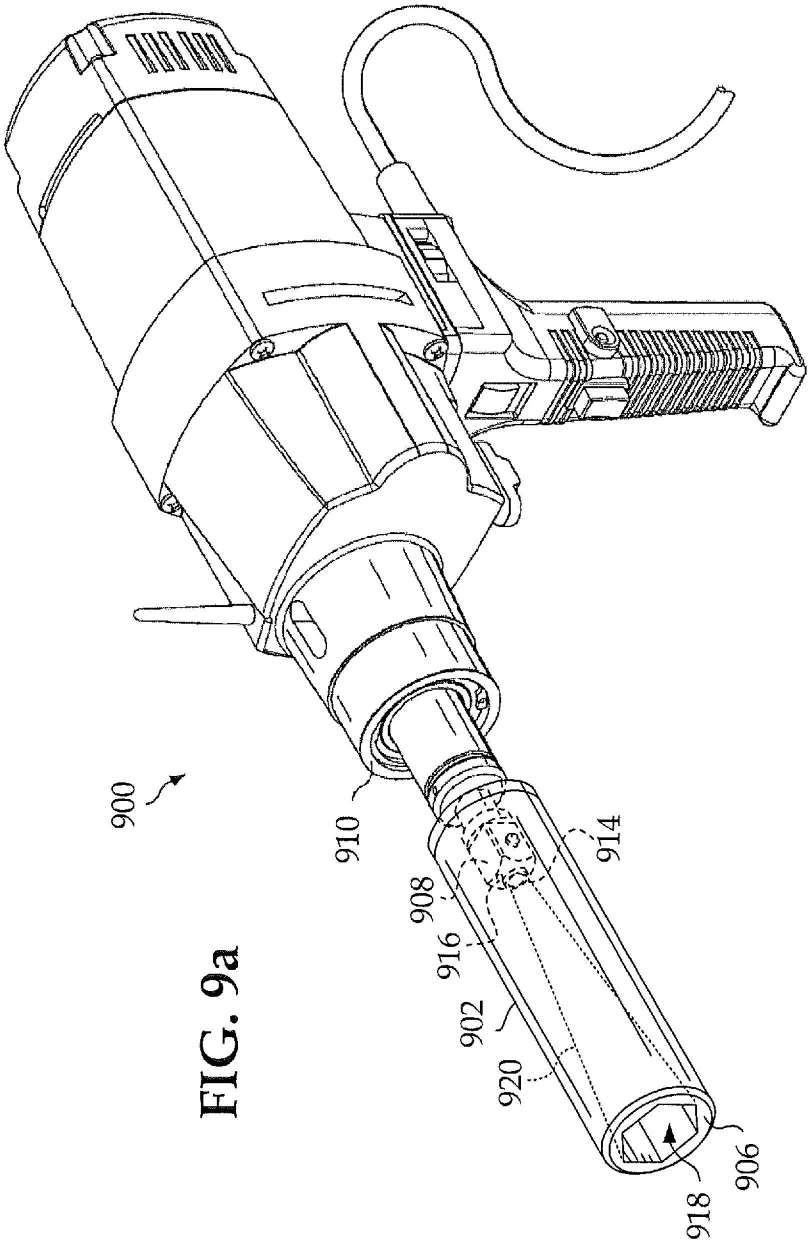
Figure 10:
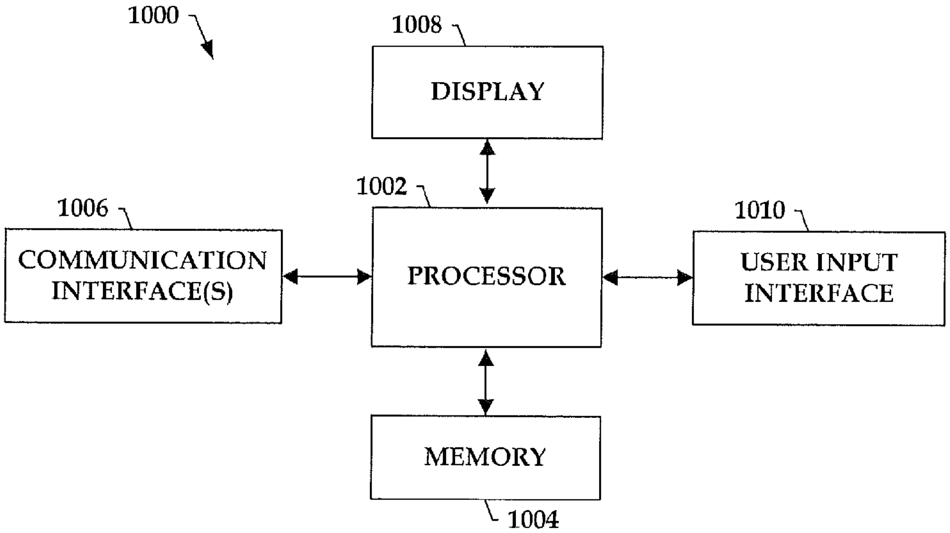
Figure 11:
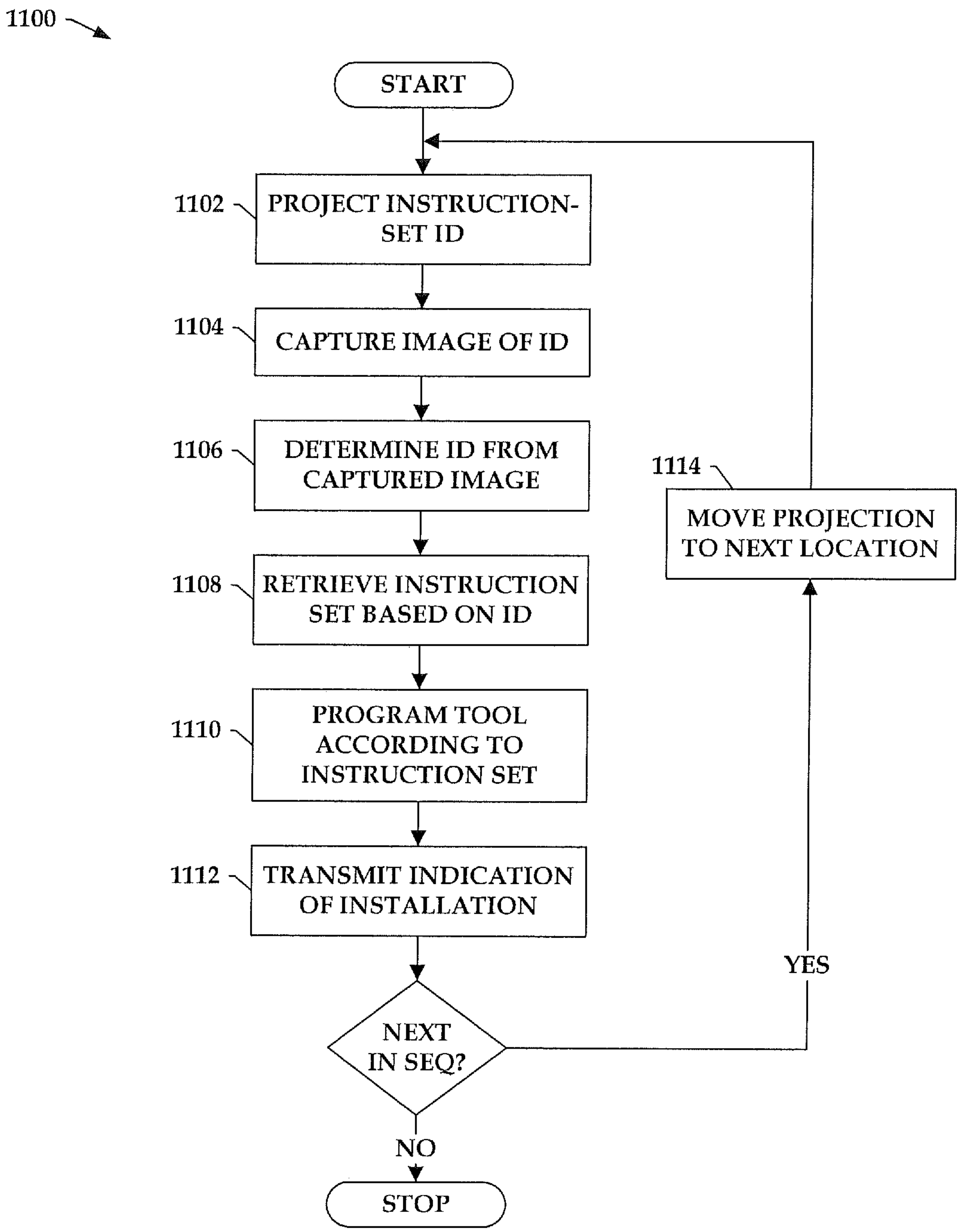
Figure 12:
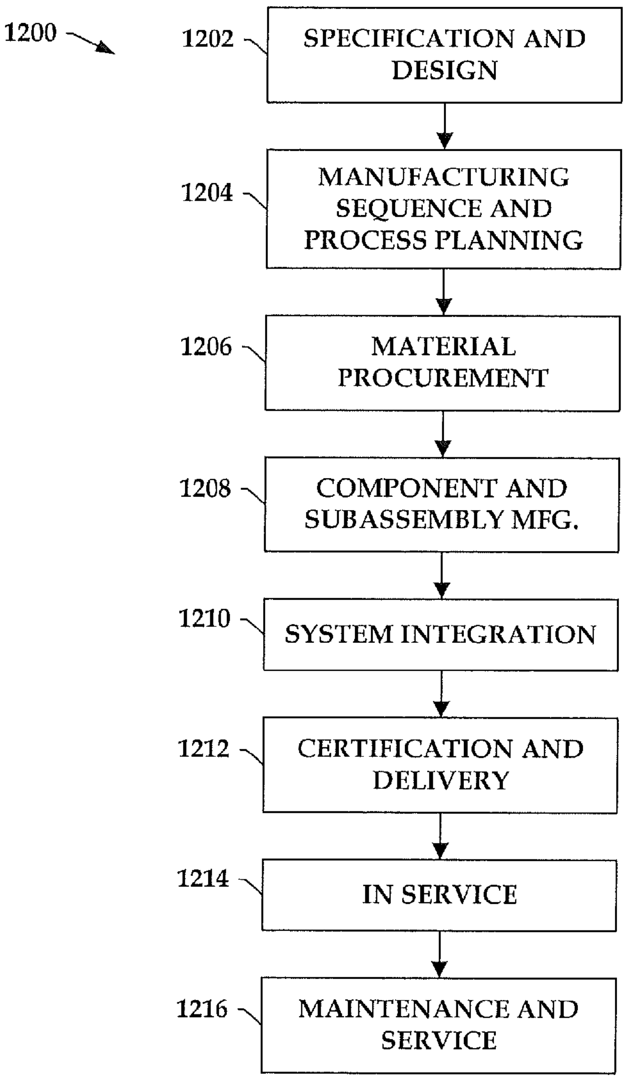
Figure 13:
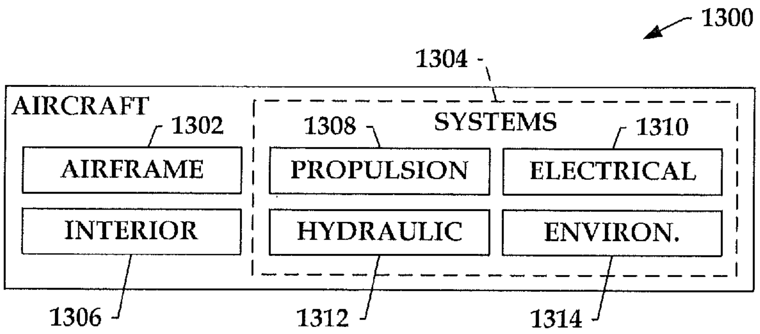

FIGS. 8, 9 and 9*a* illustrate examples of a camera integrated into or mounted on an installation tool, according to various example embodiments;

FIG. 10 illustrates an apparatus that may be configured to function as or otherwise implement one or more components of a laser projection apparatus and/or fastener installation apparatus, according to various example embodiments;

FIG. 11 is a flowchart illustrating various steps in a method according to various example embodiments;

FIG. 12 is an illustration of a flow diagram of aircraft production and service methodology according to one example embodiment; and FIG. 13 is an illustration of a block diagram of an aircraft according to one example embodiment.

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

Figure 1:
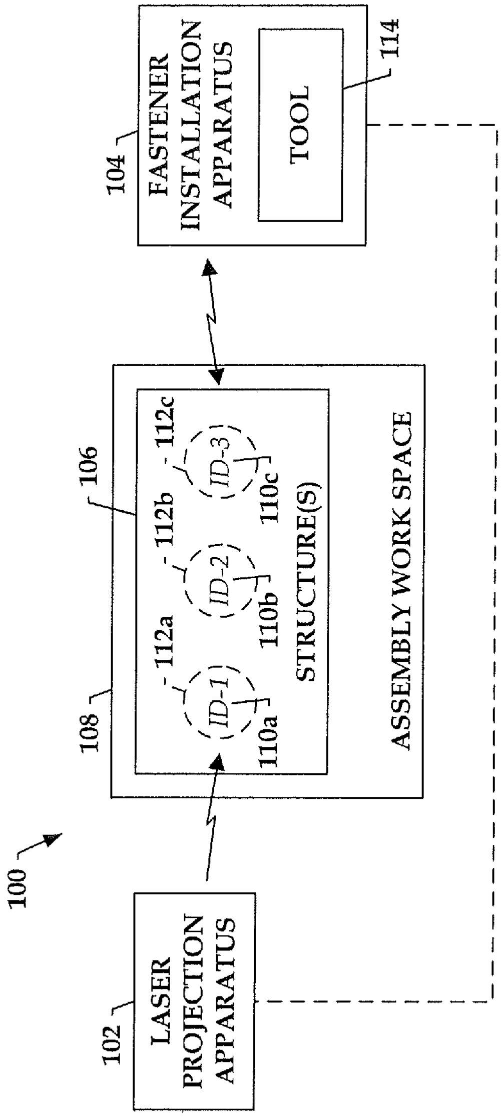
FIG. 1 illustrates a system according to one example embodiment.

FIG. 1 illustrates a system 100 according to one example embodiment of the present disclosure. As shown, the system 100 may include a laser projection apparatus 102 and fastener installation apparatus 104 that operate on one or more structures 106 (e.g., aircraft parts) in an assembly work space 108. The laser projection apparatus 102 may be generally configured to project an identifier of an instruction set including one or more instructions for installing a fastener on a structure 106, with the identifier being projected onto the structure 106 about a location at which the respective fastener or fastener collar is to be installed. FIG. 1 illustrates projection of three example instruction-set identifiers ID-1 110*a*, ID-2 110*b*, ID-3 110*c* about respective locations 112*a*, 112*b*, 112*c* (any one or more of which may be generally referenced as identifier 110 projected about location 112), although any more or less identifiers may be projected. In one example, the laser projection apparatus 102 is configured to determine the location on the structure 106 based on a file including information that defines the structure 106 and specifies the location. Although termed a "file," it should be understood that this and any other file herein may be formatted in any of a number of different manners, such as in one or more electronic files, one or more databases or the like.

In one example, the structure 106 includes a hole for receiving the fastener, and the laser projection apparatus 102 is configured to project the identifier 110 about the hole (e.g., location 112). Although primarily described in the context of a fastener, it should be understood that example embodiments may equally apply to a fastener collar. The fastener may be of any of a number of different types of fasteners, and the fastener collar may be of any of a number of different types of collars. In one example, the fastener may be an externally-threaded bolt or screw, a rivet, a pin or the like; and in one example, the fastener collar may be an internally threaded nut which screws onto the fastener to lock structures 106 together. It should also be understood, however, that the fastener need not require a collar to lock structures 106 together once installed, such as in the context of a rivet.

The fastener installation apparatus 104 is generally configured to capture an image of the projected identifier 110 from the structure 106, determine the identifier from the captured image, and retrieve the instruction set based on the determined identifier. The fastener installation apparatus 104 of one example includes an installation tool 114 for installing the respective fastener (or fastener collar). The fastener installation apparatus 104, then, may be configured to program the tool 110 according to the retrieved instruction set. The instruction set may include any of a number of different instructions for installing the fastener. In one example, one or more instructions of the instruction set include one or more of a torque, swage force or pre-load to be applied to the fastener by the tool 110.

In one example, the laser projection apparatus 102 may be configured to sequentially project the identifier 110 onto the structure 106 about a plurality of locations 112 at which a respective plurality of fasteners are to be installed, with the identifier(s) being of a respective instruction set(s). In this example, for at least two of the plurality of locations (e.g., locations 112*a*, 112*b*), the laser projection apparatus 102 may be configured to sequentially project different identifiers 110 (e.g., ID-1 110*a*, ID-2 110*b* may be different) for different instruction sets. Also in this example, for the identifier 110 projected about each location 112 in sequence, the fastener installation apparatus 104 may be configured to capture the image of the projected identifier, determine an identifier from the captured image, retrieve the instruction set based on the identifier, and program the installation tool 114 according to the retrieved instruction set. In one example, for each of at least some of the plurality of locations 112, the fastener installation apparatus 104 may be configured to transmit (by wire or wirelessly) an indication of installation of a fastener at the respective location, and in response thereto, the laser projection apparatus 102 may be configured to move projection of the identifier 110 about the respective location to projection of the identifier about a next location in sequence. More particularly, for example, the fastener installation apparatus 104 may be configured to transmit an indication of a fastener at location 112*a*. And in response, the laser projection apparatus 102 may be configured to move projection of the identifier 110*a* about the respective location 112*a* to projection of the identifier 110*b* about a next location 112*b* in sequence.

Figure 2:
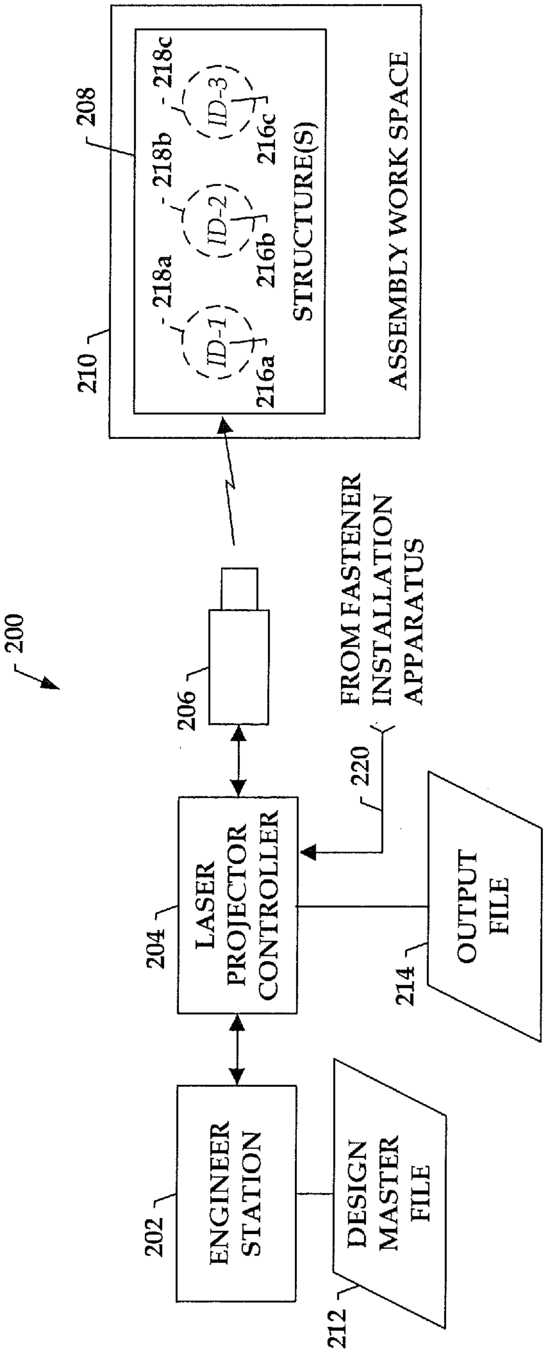
FIG. 2 illustrates a laser projection apparatus according to one example embodiment.

Reference will now be made to FIG. 2, which illustrates a more particular example of a suitable laser projection apparatus 102, according to example embodiments of the present disclosure. As shown, a laser projection apparatus 200 according to one example embodiment may include a laser projector controller 204 and laser projector 206 coupled to one another (by wire or wirelessly). The laser projection apparatus 200 may be configured to operate on one or more structures 208 in an assembly work space 210, which in one example may correspond to structure(s) 106 in assembly work space 108.

As shown, the laser projector controller 204 may be coupled to an engineer station 202, which may be configured to execute appropriate software such as Unigraphics, CATIA or another CAD/CAM-type application to allow a user (e.g., design engineer) to create a design master file 212 relating to the structure(s) 208. The design master file 212 may specify edge-of-structure information that relates to structure geometry (e.g., points, angles, lines) that defines one or more structures 208 to be assembled. In one example, the edge-of-structure information may include for each edge of a structure 208, a series of point objects connectable in a graph to form a laser projection image of the edge.

The design master file 212 may also specify fastener information for each of a plurality of fasteners. In various examples, this fastener information may include one or more of a fastener type, a fastener collar type (if the fastener includes a collar), a location on a structure 208 at which the fastener is to be installed, or an identifier (ID) of an instruction set including instruction(s) for installing the fastener on the structure 208. In one example, the fastener location may be provided by Cartesian coordinates (x, y, z) absolute or relative to one or more edges of the structure 208 on which the fastener is to be installed. In another example, the instruction-set ID may include one or more symbols (numerals, letters, etc.) for which the fastener information may include geometric information that may define the shape and/or size of the respective symbol(s). In yet another example, the fastener information may further include a sequence for installation of the fasteners at respective fastener locations.

The design master file 212 may also include calibration point information. This information may allow alignment of the laser projector 206 relative to the structure(s) 208 and fastener locations in three-dimensional space. In one example, calibration point information may provide multiple targets (e.g., six) used to align laser projections to structure(s) 208 in three-dimensional space.

Regardless of the exact content of the design master file 212, the engineer station 202, laser projector controller 204 or another facility coupled to either or both of the engineer station 202 or laser projector controller 204 may process and/or reformat the design master file 212 to produce one or more laser projection output files 214. The laser projection output file 214 may include edge-of-structure information, fastener information and calibration point information in a format understood by the laser projector controller 204.

In some examples, the laser projection output file 214 may be transferred from the engineer station 202 or other facility to the laser projector controller 204 (downloaded or uploaded). In other examples, the design master file 212 may be transferred from the engineer station 202 to the laser projector controller 204 (downloaded or uploaded), with the laser projector 206 itself producing the laser projection output file 214 (or causing the other facility to produce the laser projection output file 214). Once the laser projector controller 204 has received (or produced) the laser projection output file 214, the laser projector controller 204 may use the laser projection output file 214 for alignment of the laser projector 206 relative to the structure(s) 208 in the work space 210, and projection of one or more laser images on the structure(s) 208. As indicated above, the laser image(s) may include for one or more fasteners, one or more instruction-set IDs projected about respective location(s) on the structure(s) 208 at which the respective fastener(s) are to be installed. Similar to FIG. 1, FIG. 2 illustrates projection of three example instruction-set identifiers ID-1 216*a*, ID-2 216*b*, ID-3 216*c* about respective locations 218*a*, 218*b*, 218*c* (any one or more of which may be generally referenced as identifier 216 projected about location 218), although any more or less identifiers may be projected.

The laser projection apparatus 200 may continuously project one or more instruction-set IDs 216 or project one or more instruction-set IDs 216 for a given time period. In one example in which the fastener information includes a sequence for installation of fasteners at respective fastener locations 218, the laser projection apparatus 200 may be configured to project one or more instruction-set IDs 216 about the respective locations 218 at once or in sequence. If in sequence, the laser projection apparatus 200 may be configured to project the instruction-set ID 216 about one location 218 for a given period of time, and then move to project the same or another instruction-set ID 216 about the next location 218 in sequence for a given period of time, with the laser projection apparatus 200 similarly projecting through the locations 218 in sequence.

In one example described more fully below, the laser projection apparatus 200—or more particularly for example its controller 204—may receive from the fastener installation apparatus 104, an indication 220 of installation of a fastener at a location 218 about which the laser projection apparatus 200 is projecting an instruction-set ID 216. The laser projection apparatus 200 may respond to the indication in a number of different manners, such as by moving projection of the same or another instruction-set ID 216 about the next location 218 in sequence.

Figure 3:
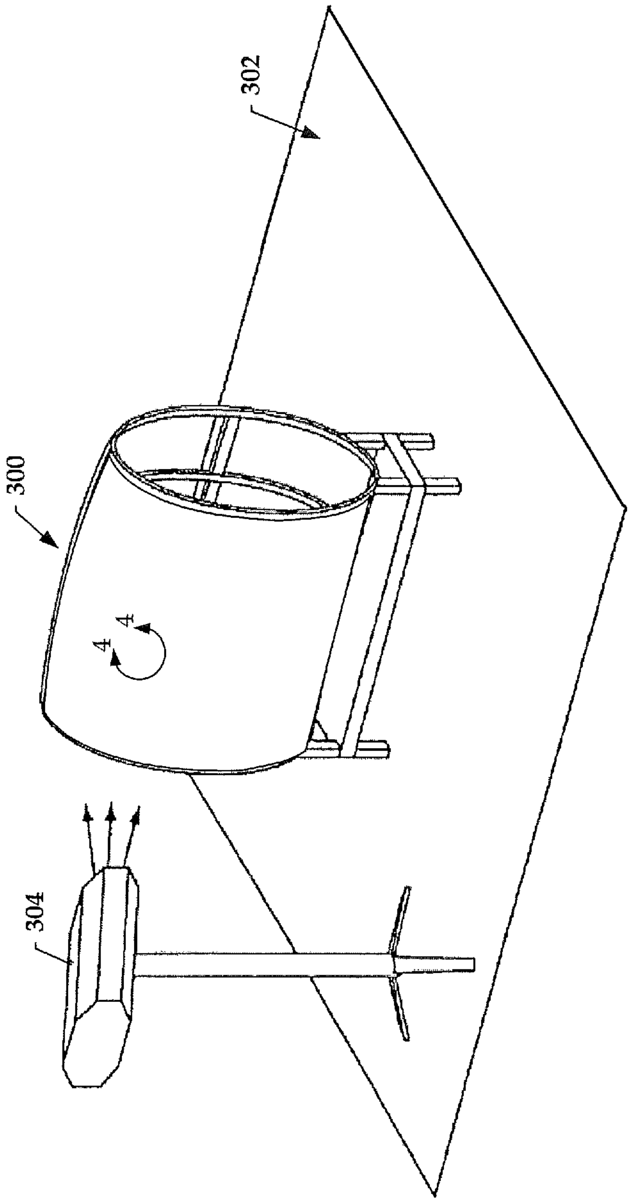
FIG. 3 illustrates a schematic representation of an example structure in an assembly work space, according to one example embodiment.

FIG. 3 shows a schematic representation of an example structure 300 in an assembly work space 302, which in one example may correspond to structure(s) 106 in assembly work space 108. In the assembly work space 302, a laser projector 304 may be positioned at a predetermined position where the laser light projected from it may be directed toward areas of the structure(s) 300. In the illustrative example of FIG. 3, the structure(s) 300 include a tubular or cylindrical frame over which sections of a surface such as a metallic surface (e.g., sheet metal) or non-metallic surface (e.g., composite material) may be positioned and attached to the frame such as to form a fluid containing tank, a section of aircraft fuselage, wing, control surface or some other similar article. It should be understood, however, that the illustrated structure(s) 300 is only an example of structure(s) 300 with which example embodiments may be practiced. The structure(s) 300 should not be interpreted as limiting.

Figure 4:
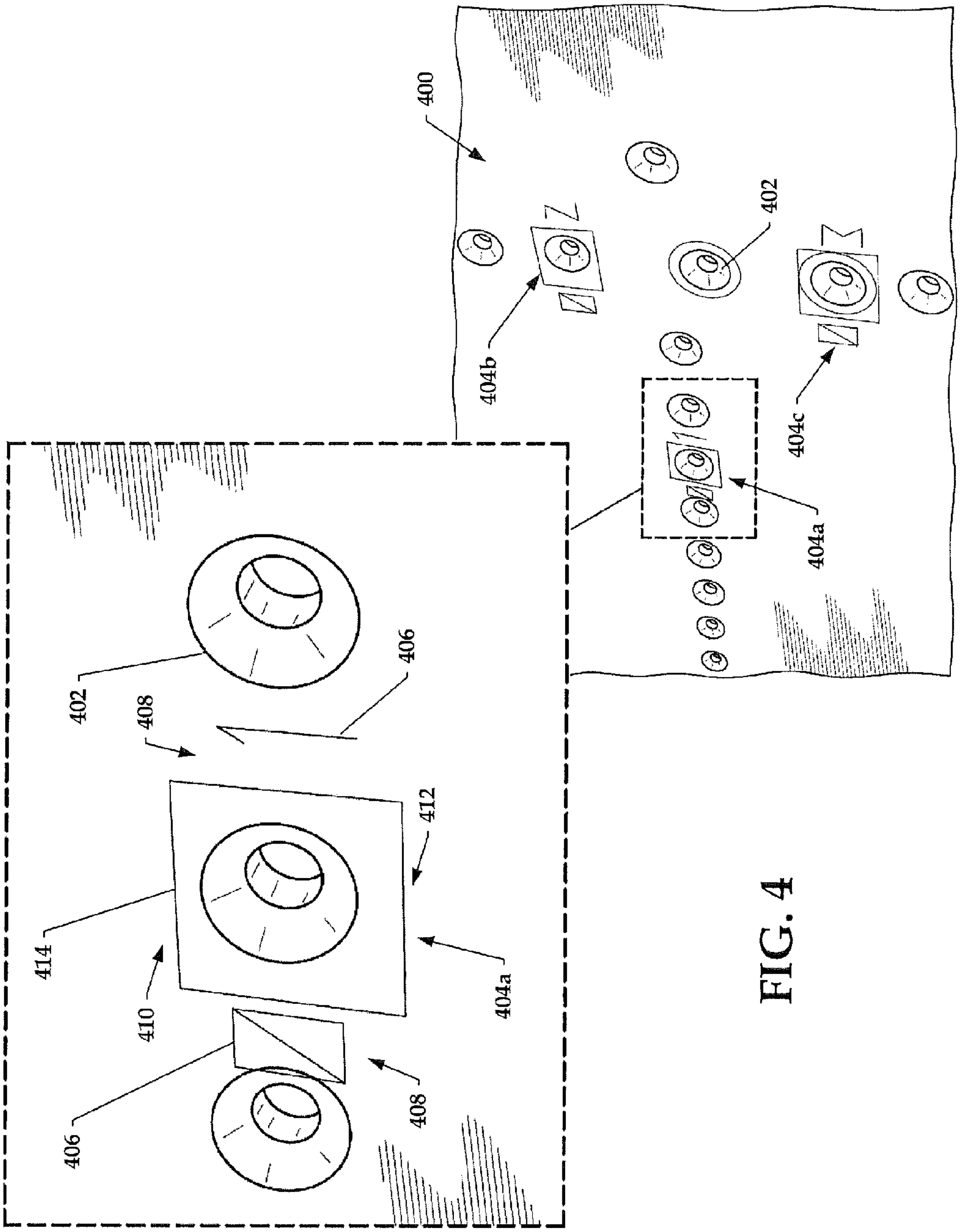
FIG. 4 illustrates a schematic representation of a portion of a section of a surface including one or more projected instruction-set identifiers, according to one example embodiment.

FIG. 4 shows a schematic representation of a portion of a section of a surface 400, which in one example may correspond to a structure 300 of FIG. 3. As shown, the surface 400 may include one or more holes 402 (e.g., countersink, non-countersink) for receiving respective fasteners, the holes 402 thereby being at locations at which the respective fasteners are to be installed. As explained above, the laser projection apparatus 102 may be configured to project one or more instruction-set IDs about respective locations and, hence, respective holes 402. FIG. 4 illustrates three example instruction-set IDs 404*a*, 404*b* and 404*c* (any one or more of which may be generally referenced as instruction-set ID 404), but it should be understood that fewer or greater than three instruction-set IDs 404 may be projected at any given time.

In one example, for any given location, the laser projection apparatus 102 may be configured to direct laser light in a predetermined pattern onto the surface 400 about the respective location. In this regard, the laser projection apparatus 102 may be configured to control laser light to move in a predetermined pattern that in turn traces or illuminates an instruction-set ID 404. The instruction-set ID 404 may be projected about the location in any of a number of different manners. As shown, for example, the instruction-set ID 404 may include one or more symbols 406 projected on either or both sides 408 of a hole 402 (or location), and/or on either or both of above 410 or below 412 the hole 402 (or location). In one example, the laser projection apparatus 102 may additionally project an alignment symbol 414 coincident with the hole 402, with the symbol(s) 406 of the instruction-set ID 404 being projected about the alignment symbol 414. The alignment symbol 414 may be any of a number of different symbols capable of correctly identifying a particular location. As shown, for example, the alignment symbol 414 may be a rectangle projected such that the appropriate hole 402 (or location) resides within the rectangle.

Figure 5:
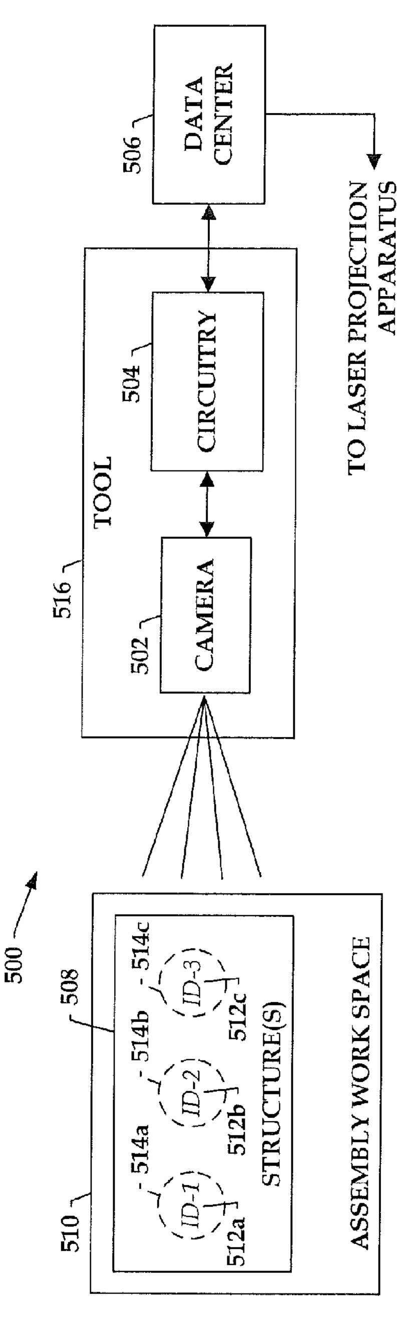
FIG. 5 illustrates a fastener installation apparatus according to one example embodiment.
Figure 6:
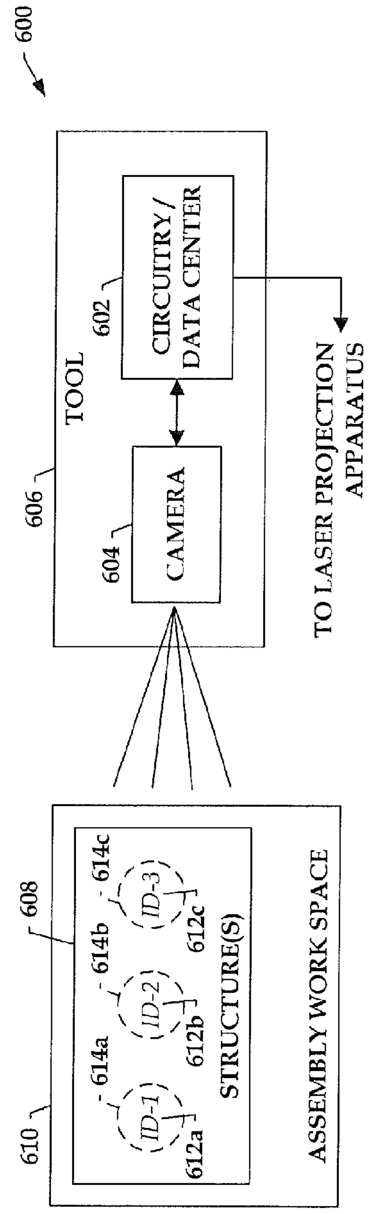
FIG. 6 illustrates a fastener installation apparatus according to another example embodiment.
Figure 7:
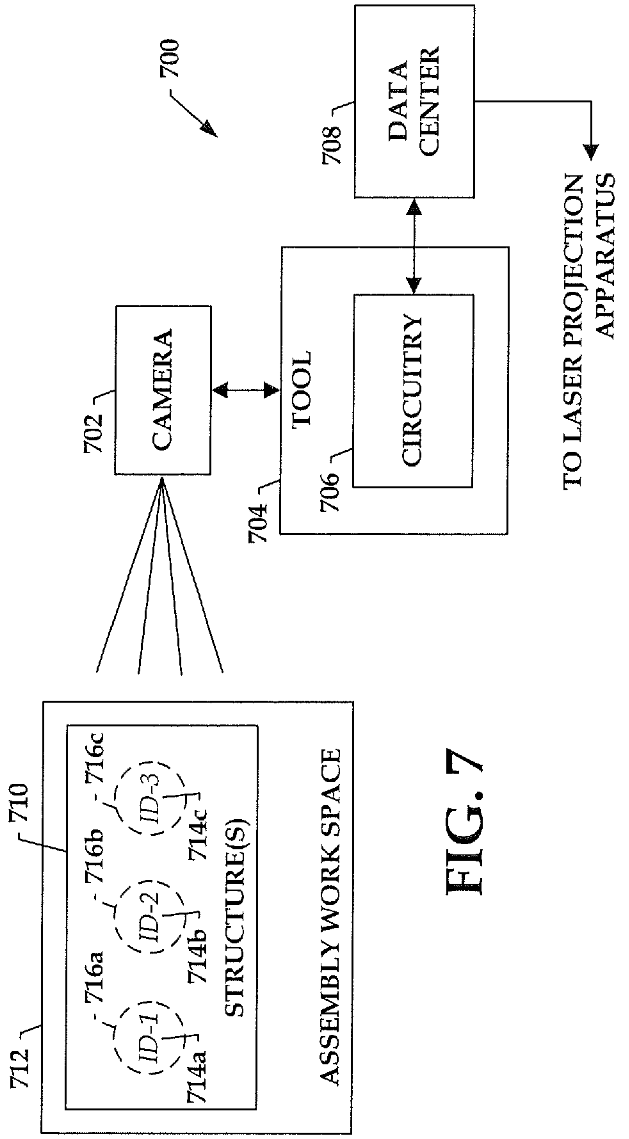
FIG. 7 illustrates a fastener installation apparatus according to yet another example embodiment.

Reference will now be made to FIGS. 5, 6 and 7, which illustrate more particular examples of a suitable fastener installation apparatus 104, according to example embodiments of the present disclosure. As shown in FIG. 5, a fastener installation apparatus 500 according to one example embodiment may include a camera 502, circuitry 504 and a data center 506, which may be coupled to one another (by wire or wirelessly). Although shown as separate components, in some example embodiments, one or more components may support more than one of the camera 502, circuitry 504 or data center 506, logically separated but co-located within the component(s). For example, a single component may support a logically separate, but co-located, camera 502 and circuitry 504. In another example, a single component may support a logically separate, but co-located, circuitry 504 and data center 506. In yet another example, a single component may support a logically separate, but co-located, camera 502, circuitry 504 and data center 506.

The fastener installation apparatus 500 may be configured to operate on one or more structures 508 in an assembly work space 510, which in one example may correspond to structure(s) 106 in assembly work space 108. In one example, the structure(s) 508 include structure(s) 508 on which a laser projection apparatus 102 (e.g., laser projection apparatus 200) is configured to project an instruction-set ID about a location at which a fastener is to be installed, such as in a manner described above. Again, FIG. 5 illustrates projection of three example instruction-set identifiers ID-1 512*a*, ID-2 512*b*, ID-3 512*c* about respective locations 514*a*, 514*b*, 514*c* (any one or more of which may be generally referenced as identifier 512 projected about location 514), although any more or less identifiers may be projected.

The fastener installation apparatus 500 may further include an installation tool 516, which may be used to install the fastener at the respective location 514, and which in one example may correspond to tool 110. In one example, the tool 516 may be a ratchet, torque wrench or other type of tool adapted to install fasteners and/or fastener collars such as bolts, screws, rivets, nuts or the like. The installation tool 516 may be physically coupled to one or more of the camera 502, circuitry 504 or data center 506. In various examples, one or more of the camera 502, circuitry 504 or data center 506 may be integrated into or mounted on the tool 516. In one example, the camera 502 may be mounted on the tool 516 such that aiming or aligning the installation tool 516 toward the location 514 about which the instruction-set ID 512 is projected brings the projection into the field of view of the camera 502. In one example, the camera 502 is a digital camera or similar device employing electronic image capture means, such as a CCD (charge coupled device). The camera 502 may be generally configured to capture an image of the instruction-set ID 512 projected onto the structure(s) 508.

In one example, the camera 502 may be configured to analyze features of the captured image of the projected instruction-set ID 512 to recognize and thereby determine the instruction-set ID from it, such as in a manner employing image-recognition or other suitable software. The camera 502 may then be configured to deliver the determined instruction-set ID to the circuitry 504, which may package it for transmission to the data center 506 (by wire or wireless). In another example, the camera 502 may be configured to deliver the captured image to the circuitry 504, which may be configured to determine the instruction-set ID and package it for transmission to the data center 506. And in yet another example, the camera 502 may be configured to deliver the captured image to the circuitry 504, which may package the image for transmission to the data center 506.

The data center 506 may receive the determined instruction-set ID or captured image of the projected instruction-set ID 512. In an instance in which the data center 506 receives the captured image, the data center 506 may determine the instruction-set ID from it. In either instance, once the data center 506 has the instruction-set ID, the data center 506 may retrieve the instruction set identified by the respective ID. In one example, the instruction set may include target installation parameters such as preload, torque or swage force. In this regard, after its retrieval, the data center 506 may transmit the instruction set back to the installation tool 516 (by wire or wirelessly). The circuitry 504 or other circuitry of the tool 516 may then program the tool 516 according to the instruction set. In one example, the circuitry 504 or other circuitry may control operation of the tool 516 in a manner to install a fastener at the location 514 on the structure(s) 508 about which the about which the instruction-set ID 512 is (or was) projected, and in one example, according to the target installation parameters.

Once the fastener has been installed at the respective location 514 by the installation tool 516, the circuitry 504 or other circuitry of the tool 516 may then send an indication of installation of the fastener to the data center 506. In one example, sensors (not shown) on the tool 516 may record actual values of the installation parameters, which the circuitry 504 or other circuitry may send as or in addition to the indication to the data center 506. The data center 506 may store the indication and/or recorded parameters in electronic files, such as in a database. Additionally or alternatively, the data center 506 may transmit the indication to the laser projection apparatus 102 (e.g., laser projection apparatus 200) projecting the instruction-set ID 512. The laser projection apparatus 102 may respond to the indication in a number of different manners. For example, the laser projection apparatus 102 may cease projecting the instruction-set ID 512 at the respective location 514. Additionally or alternatively, for example, the laser projection apparatus 102 may project the same or another instruction-set ID 512 about another location 514 on the structure(s) 508, such as a next location in a sequence. The above process may then continue for the instruction-set ID 512 projected about the next location.

As indicated above, one or more components of the fastener installation apparatus 500 may support more than one of the camera 502, circuitry 504 or data center 506, logically separated but co-located within the component(s). Likewise, one or more of the camera 502, circuitry 504 or data center 506 may be integrated into or mounted on the installation tool 516, although in other examples one or more of the camera 502, circuitry 504 or data center 506 may be separate from the tool 516. In various ones of these and other examples, the tool 516 may nonetheless include other circuitry such as to receive an instruction set and program the tool 516 accordingly.

FIGS. 6 and 7 illustrate other example embodiments in which a component may support multiple ones of the camera 502, circuitry 504 or data center 506, or one or more of the camera 502, circuitry 504 or data center 506 are separate from the installation tool 516. FIG. 6 illustrates a fastener installation apparatus 600 according to another example embodiment in which one of its components 602 supports a logically separate, but co-located, circuitry 504 and data center 506. In this example, the fastener installation apparatus 600 may include a camera 604 and installation tool 606 similar to before, and may be configured to operate on one or more structures 608 in an assembly work space 610, which in one example may correspond to structure(s) 106 in assembly work space 108, FIG. 6 illustrates projection of three example instruction-set identifiers ID-1 612*a*, ID-2 612*b*, ID-3 612*c* about respective locations 614*a*, 614*b*, 614*c* (any one or more of which may be generally referenced as identifier 612 projected about location 614), although any more or less identifiers may be projected.

In the example of FIG. 6, the circuitry/data center 602 and camera 604 may be integrated into or mounted on the installation tool 606. FIG. 7 illustrates a fastener installation apparatus 700 according to yet another example embodiment in which the fastener installation apparatus 700 includes a camera 702 separated from but in the vicinity of the installation tool 704. As in other examples, the fastener installation apparatus 700 in the example of FIG. 7 includes circuitry 706 and a data center 708 either or both of which may be integrated into or mounted on the tool 704 (the circuitry 706 being shown on the tool 704). Also as in other examples, the fastener installation apparatus 700 may be configured to operate on one or more structures 710 in an assembly work space 712, which again, in one example may correspond to structure(s) 106 in assembly work space 108. And similar to before, FIG. 7 illustrates projection of three example instruction-set identifiers ID-1 714*a*, ID-2 714*b*, ID-3 714*c* about respective locations 716*a*, 716*b*, 716*c* (any one or more of which may be generally referenced as identifier 714 projected about location 716), although any more or less identifiers may be projected.

In various example embodiments, the fastener installation apparatus 104 may include a camera integrated into or mounted on an installation tool 110. In these examples, the camera may be integrated into or mounted on an installation tool 110 in any of a number of different manners, two examples of which are illustrated in FIGS. 8 and 9.

FIG. 8 illustrates an installation tool 800, and a socket 802 having a first end 804 and a second end 806. The first end 804 may be configured to engage and be removably secured to a tool holder 808 on a spindle 810. The second end 806 may be configured to engage and be removably secured to a fastener. The tool 800 may be configured to rotate the spindle 810 in the direction of arrow 812, and when the spindle 810 is secured to a fastener, rotation of the spindle 810 may cause corresponding rotation of the fastener to thereby screw the fastener into one or more structures 106. In the example embodiment of FIG. 8, a camera 814 and light apparatus 816 may be integrated into a housing 818 of the tool 800.

FIG. 9 illustrates an installation tool 900 and socket 902 similar to that of FIG. 8. That is, the socket 902 of FIG. 9 has a first end 904 and a second end 906. The first end 904 may be configured to engage and be secured to a tool holder 908 on a spindle 910. The second end 906 may be configured to engage and be secured to a fastener. Similar to the tool 800 of FIG. 8, the tool 900 of FIG. 9 may be configured to rotate the spindle 910 in the direction of arrow 912. In the example embodiment of FIG. 9, a camera 914 and light apparatus 916 may be integrated into the tool holder 908. The socket 902 may have a channel 918. As shown in FIG. 9 and more particularly in FIG. 9*a*, when the end 904 of the socket 902 is attached to the tool holder 908, the camera 914 may have a field of view 920 extending through the channel 918. The camera 914 may therefore be capable of capturing images through the channel 918 of the socket 902.

According to example embodiments of the present disclosure, the system 100 including its laser projection apparatus 102 and fastener installation apparatus 104 may be implemented by various means. Similarly, the example of a laser projection apparatus 200 and examples of a fastener installation apparatus 500, 600, 700 including each of their respective components, may be implemented by various means according to example embodiments. Means for implementing the system, apparatuses 100, 102, 104, 200, 500, 600, 700 and their respective components may include hardware, alone or under direction of one or more computer program code instructions, program instructions or executable computer-readable program code instructions from a computer-readable storage medium.

In one example, one or more apparatuses may be provided that are configured to function as or otherwise implement one or more of the engineer station 202 or laser projector controller 204 of the example laser projection apparatus 200, and/or the camera 502, 604, 702, circuitry 504, 706, data center 506, 708, or circuitry/data center 602 of any of the example fastener installation apparatuses 500, 600, 700. In examples involving more than one apparatus, the respective apparatuses may be connected to or otherwise in communication with one another in a number of different manners, such as directly or indirectly via a wire or wirelessly.

Reference is now made to FIG. 10, which illustrates an example apparatus 1000 that may be configured to function as or otherwise implement one or more of the engineer station 202 or laser projector controller 204 of the example laser projection apparatus 200, and/or the camera 502, 604, 702, circuitry 504, 706, data center 506, 708, or circuitry/data center 602 of any of the example fastener installation apparatuses 500, 600, 700, according to example embodiments. Generally, the apparatus 1000 of example embodiments of the present disclosure may comprise, include or be embodied in one or more fixed or portable electronic devices. Examples of suitable electronic devices include a smartphone, tablet computer, laptop computer, desktop computer, workstation computer, server computer or the like. The apparatus 1000 may include one or more of each of a number of components such as, for example, a processor 1002 connected to a memory 1004.

The processor 1002 is generally any piece of hardware that is capable of processing information such as, for example, data, computer-readable program code, instructions or the like (generally "computer programs," e.g., software, firmware, etc.), and/or other suitable electronic information. More particularly, for example, the processor 1002 may be configured to execute computer programs, which may be stored onboard the processor 1002 or otherwise stored in the memory 1004 (of the same or another apparatus 1000). The processor 1002 may be a number of processors, a multi-processor core or some other type of processor, depending on the particular implementation. Further, the processor 1002 may be implemented using a number of heterogeneous processor apparatuses in which a main processor is present with one or more secondary processors on a single chip. As another illustrative example, the processor 1002 may be a symmetric multi-processor apparatus containing multiple processors of the same type. In yet another example, the processor 1002 may be embodied as or otherwise include one or more application-specific integrated circuits (ASICs), field-programmable gate arrays (FPGAs) or the like. Thus, although the processor 1002 may be capable of executing a computer program to perform one or more functions, the processor 1002 of various examples may be capable of performing one or more functions without the aid of a computer program.

The memory 1004 is generally any piece of hardware that is capable of storing information such as, for example, data, computer programs and/or other suitable information either on a temporary basis and/or a permanent basis. In one example, the memory 1004 may be configured to store various information in one or more databases. The memory 1004 may include volatile and/or non-volatile memory, and may be fixed or removable. Examples of suitable memory 1004 include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory 1004 may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processor 1002 may also but need not be connected to one or more interfaces for displaying, transmitting and/or receiving information. The interfaces may include one or more communications interfaces 1006 and/or one or more user interfaces. The communications interface 1006 may be configured to transmit and/or receive information, such as to and/or from other apparatus(es), network(s) or the like. The communications interface 1006 may be configured to transmit and/or receive information by physical (by wire) and/or wireless communications links. Examples of suitable communication interfaces include a network interface controller (NIC), wireless NIC (WNIC) or the like.

The user interfaces may include a display 1008 and/or one or more user input interfaces 1010. The display 1008 may be configured to present or otherwise display information to a user, suitable examples of which include a liquid crystal display (LCD), light-emitting diode display (LED), plasma display panel (PDP) or the like. The user input interfaces 1010 may be by wire or wireless, and may be configured to receive information from a user into the apparatus 1000, such as for processing, storage and/or display. Suitable examples of user input interfaces 1010 include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system, apparatuses and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

FIG. 11 illustrates various steps in a method 1100 according to example embodiments of the present disclosure. The method may include projecting by a laser projection apparatus 102, an identifier of an instruction set including one or more instructions for installing a fastener or fastener collar on a structure 106, as shown in block 1102. In one example, the identifier is projected onto the structure 106 about a location at which the respective fastener or fastener collar is to be installed. The method may also include capturing an image of the projected identifier from the structure 106, determining the identifier from the captured image, and retrieving the instruction set based on the determined identifier, as shown in blocks 1104, 1106 and 1108. And the method may include programming a tool 110 for installing the respective fastener or fastener collar according to the retrieved instruction set, as shown in block 1110.

In one example, the identifier may be sequentially projected onto the structure about a plurality of locations at which a respective plurality of fasteners is to be installed, with the identifier(s) being of a respective instruction set(s). As shown, in this example, for the identifier projected about each location in sequence, the image of the projected identifier may be captured, an identifier of the identifier(s) may be determined from the captured image, the instruction set may be retrieved based on the identifier, and the tool may be programmed according to the retrieved instruction set. In one example, for each of at least some of the plurality of locations, the fastener installation apparatus may be configured to transmit (by wire or wirelessly) an indication of installation of a fastener or fastener collar at the respective location, as shown in block 1112. And in response to the indication, projection of the identifier about the respective location may be moved to projection of the identifier about a next location in sequence, as shown in block 1114.

Embodiments of the disclosure may find use in a variety of potential applications, particularly in the transportation industry, including for example, aerospace, marine and automotive applications. Thus, referring now to FIGS. 12 and 13, example embodiments may be used in the context of an aircraft manufacturing and service method 1200 as shown in FIG. 12, and an aircraft 1300 as shown in FIG. 13. During pre-production, the example method may include specification and design 1202 of the aircraft 1300, manufacturing sequence and processing planning 1204 and material procurement 1206. The disclosed method may be specified for use during the specification and design 1202 of the aircraft 1300, and/or manufacturing sequence and process planning 1204. During production, component and subassembly manufacturing 1208 and system integration 1210 of the aircraft 1300 takes place. The disclosed method and apparatus may be used to install fasteners during either or both of the component and subassembly manufacturing process 1208 or system integration 1210. Thereafter, the aircraft 1300 may go through certification and delivery 1212 in order to be placed in service 1214. While in service 1214 by a customer, the aircraft 1300 may be scheduled for routine maintenance and service 1216 (which may also include modification, reconfiguration, refurbishment or the like). Fasteners may be installed on the aircraft 1300 according to the disclosed method while in service 1214, and in one example, during the maintenance and service 1216.

Each of the processes of the example method 1200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As shown in FIG. 13, an example aircraft 1300 produced by the example method 1200 may include an airframe 1302 with a plurality of systems 1304 and an interior 1306. Fasteners installed according to the disclosed method and system may be used in the airframe 1302 and within the interior. Examples of high-level systems 1304 include one or more of a propulsion system 1308, electrical system 1310, hydraulic system 1312, environmental system 1314 or the like. Any number of other systems 1304 may be included. Although an aerospace example is shown, the principles of the disclosure may be applied to other industries, such as the marine and automotive industries.

Systems and methods embodied herein may be employed during any one or more of the stages of the example production and service method 1200. For example, components or subassemblies corresponding to production process 1208 may be assembled using fasteners installed according to the disclosed method while the aircraft 1300 is in service 1214. Also, one or more example system embodiments, method embodiments or a combination thereof may be utilized to install fasteners during the production stages 1208 and 1210, which may substantially expedite assembly of or reduce the cost of an aircraft 1300. Similarly, one or more of system embodiments, method embodiments or a combination thereof may be utilized while the aircraft 1300 is in service 1214, for example.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

projecting an identifier of an instruction set, the identifier being projected onto a structure about a location at which a fastener or fastener collar is to be installed;

capturing an image of the projected identifier from the structure;

determining the identifier from the captured image;

retrieving the instruction set based on the determined identifier; and programming a tool for installing the respective fastener or fastener collar according to the retrieved instruction set.

2. The method of claim 1 further comprising:

determining the location on the structure based on a file including information that defines the structure and specifies the location.

3. The method of claim 1, wherein the identifier is of an instruction set including one or more instructions for installing the respective fastener or fastener collar.

4. The method of claim 3, wherein one or more instructions of the instruction set include one or more of a torque, swage force or pre-load to be applied to the fastener or fastener collar by the tool.

5. The method of claim 1, wherein projecting the identifier includes sequentially projecting the identifier onto the structure about a plurality of locations at which a respective plurality of fasteners or fastener collars are to be installed, the one or more identifiers being of a respective one or more instruction sets, and wherein capturing the image of the projected identifier, determining an identifier from the captured image, retrieving the instruction set based on the identifier, and programming the tool according to the retrieved instruction set occur for the identifier projected about each location in sequence.

6. The method of claim 5, wherein sequentially projecting the identifier includes for at least two of the plurality of locations, sequentially projecting different identifiers for different instruction sets.

7. The method of claim 5 further comprising for each of at least some of the plurality of locations:

transmitting an indication of installation of a fastener or fastener collar at the respective location, wherein sequentially projecting the identifier includes, in response to the indication, the laser projection apparatus moving projection of the identifier about the respective location to projection of the identifier about a next location in sequence.

8. The method of claim 1, wherein programming the tool includes programming the tool configured to engage the respective fastener or fastener collar for installation of the respective fastener or fastener collar according to the retrieved instruction set.

9. A laser projection apparatus comprising:

a laser projector; and a laser projector controller coupled to the laser projector and configured to control operation of the laser projector, wherein the laser projector controller is configured to control the laser projector to project an identifier of an instruction set including one or more instructions for installing a fastener or fastener collar on a structure, the laser projector being configured to project the identifier onto the structure about a location at which the respective fastener or fastener collar is to be installed, an image of the identifier being capturable from the structure by a fastener installation apparatus configured to determine the identifier from the captured image, and retrieve the instruction set based on the determined identifier, the fastener installation apparatus including a tool for installing the respective fastener or fastener collar, the fastener installation apparatus being configured to program the tool according to the retrieved instruction set.

10. The laser projection apparatus of claim 9, wherein the laser projector controller is configured to determine the location on the structure based on a file including information that defines the structure and specifies the location.

11. The laser projection apparatus of claim 9, wherein one or more instructions of the instruction set include one or more of a torque, swage force or pre-load to be applied to the fastener or fastener collar.

12. The laser projection apparatus of claim 9, wherein the laser projector controller is configured to control the laser projector to sequentially project the identifier onto the structure about a plurality of locations at which a respective plurality of fasteners or fastener collars are to be installed, the one or more identifiers being of a respective one or more instruction sets, and wherein the identifier projected about each location in sequence is capturable by the fastener installation apparatus configured to determine an identifier from the captured image, retrieve the instruction set based on the identifier, and program the tool according to the retrieved instruction set.

13. The laser projection apparatus of claim 12, wherein the laser projector controller being configured to control the laser projector to sequentially project the identifier includes for at least two of the plurality of locations, being configured control the laser projector to sequentially project different identifiers for different instruction sets.

14. The laser projection apparatus of claim 12, wherein for each of at least some of the plurality of locations, the laser projector controller is configured to receive, from the fastener installation apparatus, an indication of installation of a fastener or fastener collar at the respective location, and in response thereto, control the laser projector to move projection of the identifier about the respective location to projection of the identifier about a next location in sequence.

15. A fastener installation apparatus comprising:

a camera configured to capture an image of an identifier of an instruction set including one or more instructions for installing a fastener or fastener collar on a structure, the identifier being projected by a laser projection apparatus onto the structure about a location at which the respective fastener or fastener collar is to be installed;

a component configured to determine the identifier from the captured image;

a data center configured to retrieve the instruction set based on the determined identifier; and a tool for installing the respective fastener or fastener collar, the tool being programmable according to the retrieved instruction set.

16. The fastener installation apparatus of claim 15, wherein the component comprises the camera, data center or circuitry coupled to the camera or data center.

17. The fastener installation apparatus of claim 15, wherein one or more of the camera, component or data center are integrated into or mounted on the tool.

18. The fastener installation apparatus of claim 15, wherein one or more instructions of the instruction set include one or more of a torque, swage force or pre-load to be applied to the fastener or fastener collar by the tool.

19. The fastener installation apparatus of claim 15, wherein the laser projection apparatus is configured to sequentially project the identifier onto the structure about a plurality of locations at which a respective plurality of fasteners or fastener collars are to be installed, the one or more identifiers being of a respective one or more instruction sets, and wherein for the identifier projected about each location in sequence, the camera is configured to capture the image of the projected identifier, the component is configured to determine an identifier from the captured image, and the data center is configured to retrieve the instruction set based on the identifier, the tool being programmable according to the retrieved instruction set.

20. The fastener installation apparatus of claim 19, wherein for each of at least some of the plurality of locations, the data center is configured to transmit an indication of installation of a fastener or fastener collar at the respective location, the data center being configured to transmit the indication to cause the laser projection apparatus to move projection of the identifier about the respective location to projection of the identifier about a next location in sequence.

21. A system comprising:

a laser projection system configured to project an identifier of an instruction set including one or more instructions for installing a fastener or fastener collar on a structure, the laser projection system being configured to project the identifier onto the structure about a location at which the respective fastener or fastener collar is to be installed; and a fastener installation system configured to capture an image of the projected identifier from the structure, determine the identifier from the captured image, and retrieve the instruction set based on the determined identifier, wherein the fastener installation system includes a tool for installing the respective fastener or fastener collar, the fastener installation system being configured to program the tool according to the retrieved instruction set.

22. The system of claim 21, wherein the laser projection system is configured to determine the location on the structure based on a file including information that defines the structure and specifies the location.

23. The system of claim 21, wherein one or more instructions of the instruction set include one or more of a torque, swage force or pre-load to be applied to the fastener or fastener collar by the tool.

24. The system of claim 21, wherein the laser projection system is configured to sequentially project the identifier onto the structure about a plurality of locations at which a respective plurality of fasteners or fastener collars are to be installed, the one or more identifiers being of a respective one or more instruction sets, and wherein for the identifier projected about each location in sequence, the fastener installation system is configured to capture the image of the projected identifier, determine an identifier from the captured image, retrieve the instruction set based on the identifier, and program the tool according to the retrieved instruction set.

25. The system of claim 24, wherein the laser projection system being configured to sequentially project the identifier includes for at least two of the plurality of locations, being configured to sequentially project different identifiers for different instruction sets.

26. The system of claim 24, wherein for each of at least some of the plurality of locations, the fastener installation system is configured to transmit an indication of installation of a fastener or fastener collar at the respective location, and in response thereto, the laser projection system is configured to move projection of the identifier about the respective location to projection of the identifier about a next location in sequence.

* * * * *